United States Patent
Takeda (10) Patent No.: US 11,316,205 B2
(45) Date of Patent: *Apr. 26, 2022

(54) LITHIUM ION SECONDARY BATTERY AND METHOD OF MANUFACTURING THE SAME

(71) Applicant: TOYOTA JIDOSHA KABUSHIKI KAISHA, Toyota (JP)

(72) Inventor: Kazuhisa Takeda, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/246,377

(22) Filed: Apr. 30, 2021

(65) Prior Publication Data

US 2021/0257671 A1 Aug. 19, 2021

Related U.S. Application Data

(62) Division of application No. 16/112,894, filed on Aug. 27, 2018, now Pat. No. 11,152,645.

(30) Foreign Application Priority Data

Sep. 28, 2017 (JP) .............................. JP2017-188470

(51) Int. Cl.
*H01M 10/0585* (2010.01)
*H01M 10/42* (2006.01)
*H01M 10/0525* (2010.01)

(52) U.S. Cl.
CPC ... *H01M 10/0585* (2013.01); *H01M 10/0525* (2013.01); *H01M 10/4235* (2013.01)

(58) Field of Classification Search
CPC ......... H01M 10/0585; H01M 10/0525; H01M 10/0569; H01M 10/0567; H01M 10/14;
(Continued)

(56) References Cited

U.S. PATENT DOCUMENTS 8,758,938 B2 * 6/2014 Ogihara ................ H01M 4/606
429/218.1
2013/0136972 A1 5/2013 Ogihara
(Continued)

FOREIGN PATENT DOCUMENTS

CN 103155246 A 6/2013
CN 106159313 A 11/2016
(Continued)

OTHER PUBLICATIONS

JP-2013109866-A English machine translation (Year: 2020).*
Notice of Allowance dated Jun. 30, 2021 in U.S. Appl. No. 16/112,894.

*Primary Examiner* — Ula C Ruddock
*Assistant Examiner* — Armindo Carvalho, Jr.
(74) *Attorney, Agent, or Firm* — Sughrue Mion, PLLC (57) ABSTRACT

A lithium ion secondary battery includes at least a positive electrode, a separator, a first intermediate layer, a second intermediate layer, and a negative electrode. The separator is arranged between the positive electrode and the negative electrode. The first intermediate layer is arranged between the separator and the negative electrode. The second intermediate layer is arranged between the first intermediate layer and the negative electrode. The first intermediate layer and the second intermediate layer are each a porous layer. The first intermediate layer contains at least a metal organic framework. The second intermediate layer is electrically insulating.

3 Claims, 8 Drawing Sheets

(58) Field of Classification Search
CPC ........... H01M 10/4235; H01M 50/451; H01M 50/461; H01M 4/667; H01M 4/606
See application file for complete search history.

(56) References Cited

U.S. PATENT DOCUMENTS

| | | |
|---|---|---|
| 2016/0336625 A1 | 11/2016 | Jeong et al. |
| 2019/0097272 A1 | 3/2019 | Takeda |

FOREIGN PATENT DOCUMENTS

| | | | |
|---|---|---|---|
| JP | 2010-219012 A | | 9/2010 |
| JP | 2013-109866 A | | 6/2013 |
| JP | 2013109866 A | * | 6/2013 |
| JP | 2014-154446 A | | 8/2014 |
| JP | 2017-022186 A | | 1/2017 |

* cited by examiner

LITHIUM ION SECONDARY BATTERY AND METHOD OF MANUFACTURING THE SAME

CROSS REFERENCE TO RELATED APPLICATIONS

The present application is a divisional of U.S. patent application Ser. No. 16/112,894, filed Aug. 27, 2018, which claims priority based on Japanese Patent Application No. 2017-188470 filed with the Japan Patent Office on Sep. 28, 2017, the disclosures of which are incorporated herein by reference in their respective entireties.

BACKGROUND

Field

The present disclosure relates to a lithium ion secondary battery and a method of manufacturing the same.

Description of the Background Art

Japanese Patent Laying-Open No. 2014-154446 discloses a configuration capable of suppressing precipitation of a material derived from charge carriers.

SUMMARY

In a lithium ion secondary battery (which may be abbreviated as a "battery" below), during charging, lithium (Li) ions are absorbed into a negative electrode. For example, in a low-temperature environment, absorption capability of the negative electrode lowers. For example, when charging with a high current is performed, a rate of supply of Li ions to the negative electrode may exceed the absorption capability of the negative electrode. Therefore, during charging in the low-temperature environment, the negative electrode may not fully absorb Li ions during charging with a high current.

It is expected that Li ions which cannot fully be absorbed into the negative electrode are reduced to a metal at a surface of the negative electrode. It is thus expected that an Li metal is precipitated. The Li metal is expected to dendritically grow. The dendritically grown Li metal is also called "Li dendrite".

In a discharged battery, a negative electrode is supposed to be higher in potential than the Li metal. Therefore, when the battery is left in a discharged state, a portion of Li dendrite in contact with the negative electrode (a root so to speak) may be oxidized by the negative electrode. Namely, the Li metal is expected to return to Li ions and to be absorbed into the negative electrode.

As a result of ionization of the root, a portion of Li dendrite other than the root will lose contact with the negative electrode. Li dendrite which has lost contact with the negative electrode will remain in the battery. Li dendrite is highly reactive. When the battery is heated, a heat generation reaction of Li dendrite may occur.

An object of the present disclosure is to reduce Li dendrite.

Technical features and functions and effects of the present disclosure will be described below. A functional mechanism of the present disclosure, however, includes presumption. The scope of claims should not be limited by whether or not the functional mechanism is correct.

[1] A lithium ion secondary battery includes at least a positive electrode, a separator, a first intermediate layer, a second intermediate layer, and a negative electrode. The separator is arranged between the positive electrode and the negative electrode. The first intermediate layer is arranged between the separator and the negative electrode. The second intermediate layer is arranged between the first intermediate layer and the negative electrode. The first intermediate layer and the second intermediate layer are each a porous layer. The first intermediate layer contains at least a metal organic framework. The second intermediate layer is electrically insulating. The metal organic framework is formed by alternately stacking a first layer and a second layer. The first layer is formed by stacking an aromatic compound in a direction intersecting with a direction of stack of the first layer and the second layer. The aromatic compound contains two carboxylate anions. The two carboxylate anions satisfy para-positional relation. The second layer is formed of lithium ions coordinated to the carboxylate anion.

In the lithium ion secondary battery in the present disclosure, with a functional mechanism below, reduction in Li dendrite is expected.

Figure 1:
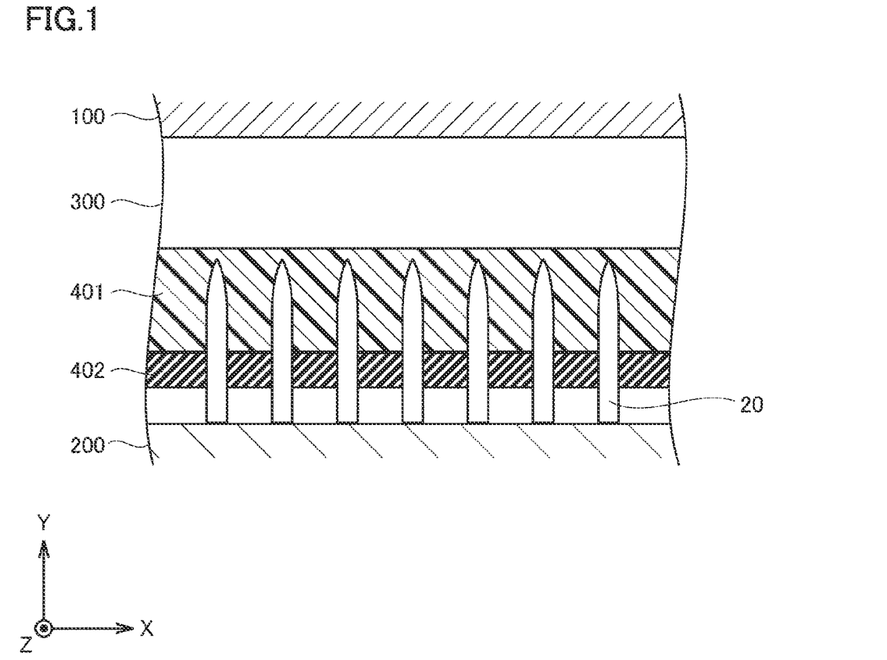
FIG. 1 is a first conceptual diagram illustrating a functional mechanism of the present disclosure.

FIG. 1 is a first conceptual diagram illustrating a functional mechanism of the present disclosure.

A first intermediate layer 401 and a second intermediate layer 402 are arranged between a separator 300 and a negative electrode 200. Though a state that second intermediate layer 402 is distant from negative electrode 200 is shown for the sake of convenience, second intermediate layer 402 may be regarded as being in contact with negative electrode 200.

For example, Li dendrite 20 is precipitated at a surface of negative electrode 200 owing to charging with a high current. Li dendrite 20 grows toward a counter electrode (a positive electrode 100). First intermediate layer 401 and second intermediate layer 402 are each a porous layer. Li dendrite 20 passes through pores in second intermediate layer 402 and first intermediate layer 401 during a process of growth.

Figure 2:
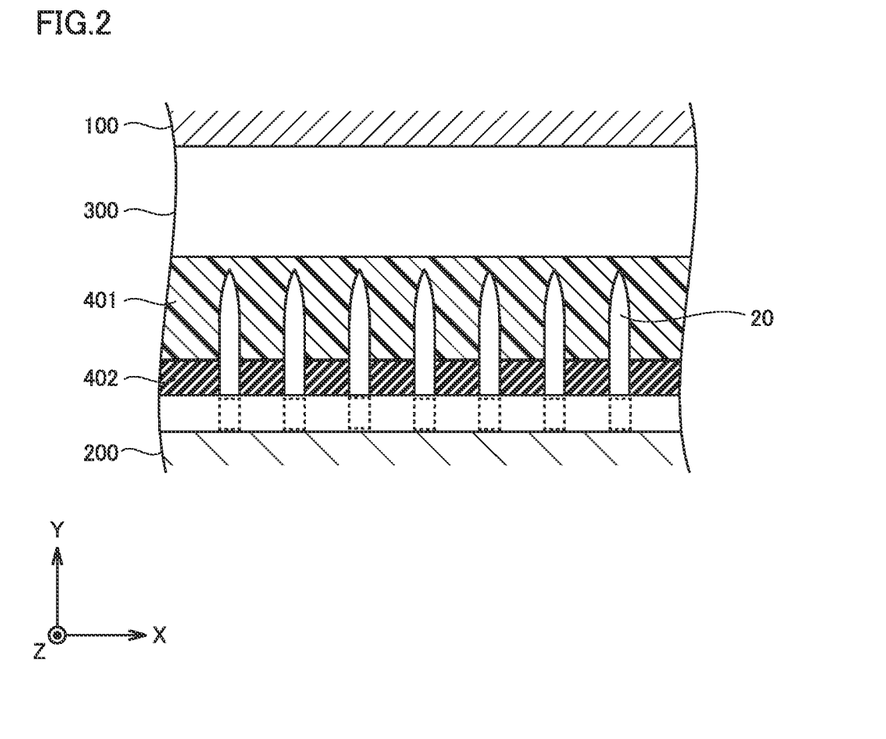
FIG. 2 is a second conceptual diagram illustrating the functional mechanism of the present disclosure.

FIG. 2 is a second conceptual diagram illustrating the functional mechanism of the present disclosure.

After charging, a battery is discharged. A potential of negative electrode 200 thus increases. The battery is left in a discharged state. Thus, negative electrode 200 oxidizes (ionizes) a root of Li dendrite 20. A portion of Li dendrite 20 shown with a dotted line represents a portion where Li dendrite 20 has been ionized and absorbed into negative electrode 200. As a result of ionization of the root, Li dendrite 20 loses contact with negative electrode 200.

Figure 3:
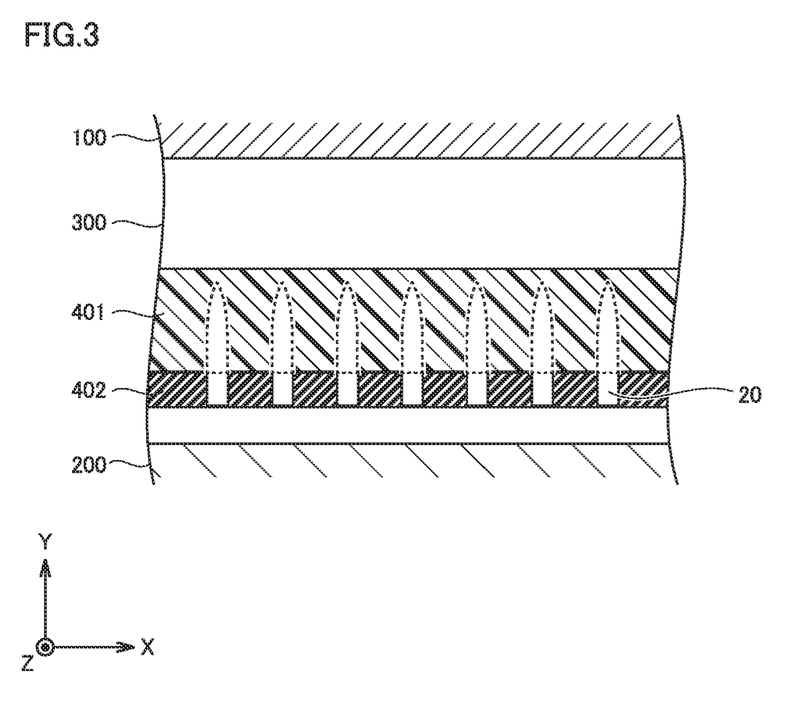
FIG. 3 is a third conceptual diagram illustrating the functional mechanism of the present disclosure.

FIG. 3 is a third conceptual diagram illustrating the functional mechanism of the present disclosure.

First intermediate layer 401 contains at least a specific metal organic framework (MOF). The MOF can oxidize an Li metal (Li dendrite 20). Furthermore, the MOF can absorb Li ions generated as a result of oxidation of Li dendrite 20. A portion of Li dendrite 20 shown with a dotted line represents a portion where Li dendrite 20 has been ionized and absorbed into the MOF. With oxidation of the Li metal, the MOF itself is reduced. Namely, a potential of the MOF lowers. It is considered that when the potential of the MOF lowers to a prescribed value, the MOF can no longer absorb Li ions.

For example, when the battery is left in a high-temperature environment, however, the MOF releases Li ions through natural discharging. It is thus expected that the potential of the MOF increases and the MOF returns to a state that it is able to absorb Li dendrite 20. It is expected that the MOF can reduce Li dendrite in a repetitive manner.

It is considered that reduction in Li dendrite is difficult unless second intermediate layer 402 is provided. Second intermediate layer 402 is electrically insulating. In the present disclosure, second intermediate layer 402 electrically isolates first intermediate layer 401 from negative electrode 200.

Figure 4:
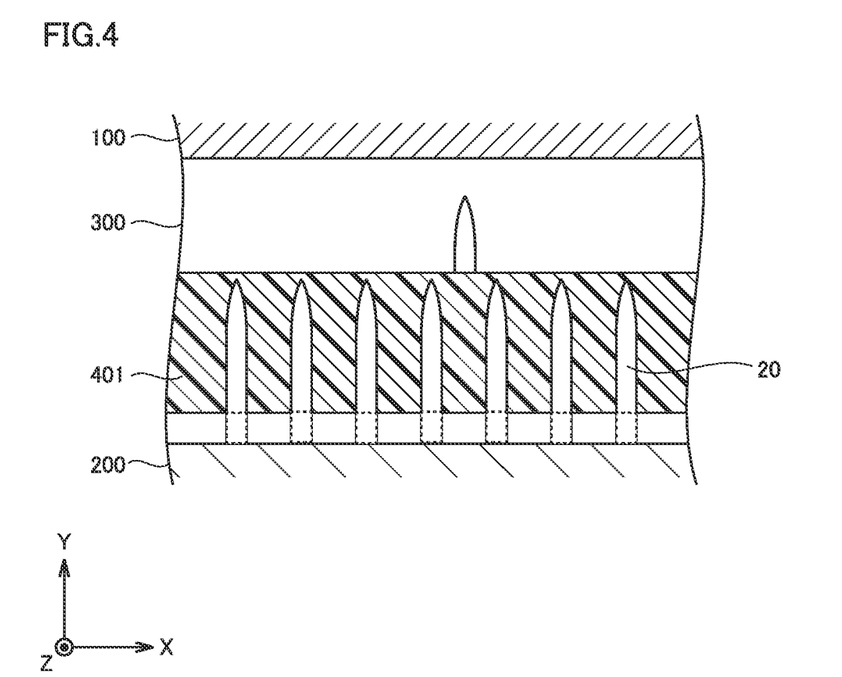
FIG. 4 is a fourth conceptual diagram illustrating the functional mechanism of the present disclosure.

FIG. 4 is a fourth conceptual diagram illustrating the functional mechanism of the present disclosure.

FIG. 4 shows a state that first intermediate layer 401 is distant from negative electrode 200 for the sake of convenience. Without second intermediate layer 402, first intermediate layer 401 will be in direct contact with negative electrode 200. Namely, first intermediate layer 401 and negative electrode 200 are short-circuited to each other. First intermediate layer 401 and negative electrode 200 are thus equal to each other in potential. When first intermediate layer 401 and negative electrode 200 are equal to each other in potential, Li ions can be absorbed also into the MOF in first intermediate layer 401 during charging. It is also expected that the MOF receives supply of Li ions from negative electrode 200. Therefore, the MOF is considered to always be unable to absorb Li dendrite 20 (that is, in a charged state). Furthermore, it is expected that Li dendrite 20 is produced from first intermediate layer 401 and grows toward positive electrode 100.

In the present disclosure, second intermediate layer 402 is arranged between first intermediate layer 401 and negative electrode 200 so that first intermediate layer 401 is electrically independent of negative electrode 200. Since first intermediate layer 401 is electrically independent of negative electrode 200 in the present disclosure, it is expected that Li dendrite 20 which has lost contact with negative electrode 200 can react with first intermediate layer 401 (MOF).

[2] The first intermediate layer has a first weight per unit area. The second intermediate layer has a second weight per unit area. The second weight per unit area may be smaller than the first weight per unit area.

The "weight per unit area" herein represents a mass per unit area. The weight per unit area is expressed, for example, with "mg/cm$^2$". As shown in FIG. 3, in the present disclosure, it is expected that Li dendrite 20 finally remains only in second intermediate layer 402. With second intermediate layer 402 being smaller in weight per unit area, reduction in amount of remaining Li dendrite 20 is expected.

[3] The aromatic compound may be expressed, for example, with a formula (I) below:

(I)

[4] A method of manufacturing a lithium ion secondary battery includes at least (A) to (C) below:

(A) Forming a first intermediate layer by applying a first paste to a surface of a separator;

(B) Forming a second intermediate layer by applying a second paste to a surface of the first intermediate layer; and (C) Arranging a positive electrode, the separator, and a negative electrode.

The separator is arranged between the positive electrode and the negative electrode. The negative electrode is arranged to be opposed to the second intermediate layer. The first paste contains at least a reaction product of aromatic dicarboxylic acid and lithium hydroxide and an organic solvent. The second paste contains at least an inorganic filler and water.

According to the manufacturing method in the present disclosure, the lithium ion secondary battery in the present disclosure can be manufactured. In the manufacturing method in the present disclosure, an organic solvent is used for a first paste for forming first intermediate layer 401. When water is used for the first paste, a reaction product of aromatic dicarboxylic acid and lithium hydroxide may be unable to maintain crystal structure.

Furthermore, in the manufacturing method in the present disclosure, water is used for a paste for forming second intermediate layer 402. When an organic solvent is used for second intermediate layer 402, first intermediate layer 401 and second intermediate layer 402 may be compatible with each other. When first intermediate layer 401 and second intermediate layer 402 are compatible with each other, first intermediate layer 401 and negative electrode 200 may be short-circuited to each other.

[5] The first intermediate layer is formed to have a first weight per unit area. The second intermediate layer is formed to have a second weight per unit area. The second weight per unit area may be smaller than the first weight per unit area.

With second intermediate layer 402 being smaller in weight per unit area, reduction in amount of remaining Li dendrite 20 is expected.

[6] Aromatic dicarboxylic acid may be expressed, for example, with a formula (II) below:

(II)

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure (which is herein denoted as the "present embodiment") will be described below. The description below, however, does not limit the scope of claims.

The description herein expressing a numerical range such as "1 to 100" means "not smaller than 1 and not greater than 100" unless otherwise specified.

<Lithium Ion Secondary Battery>

Figure 5:
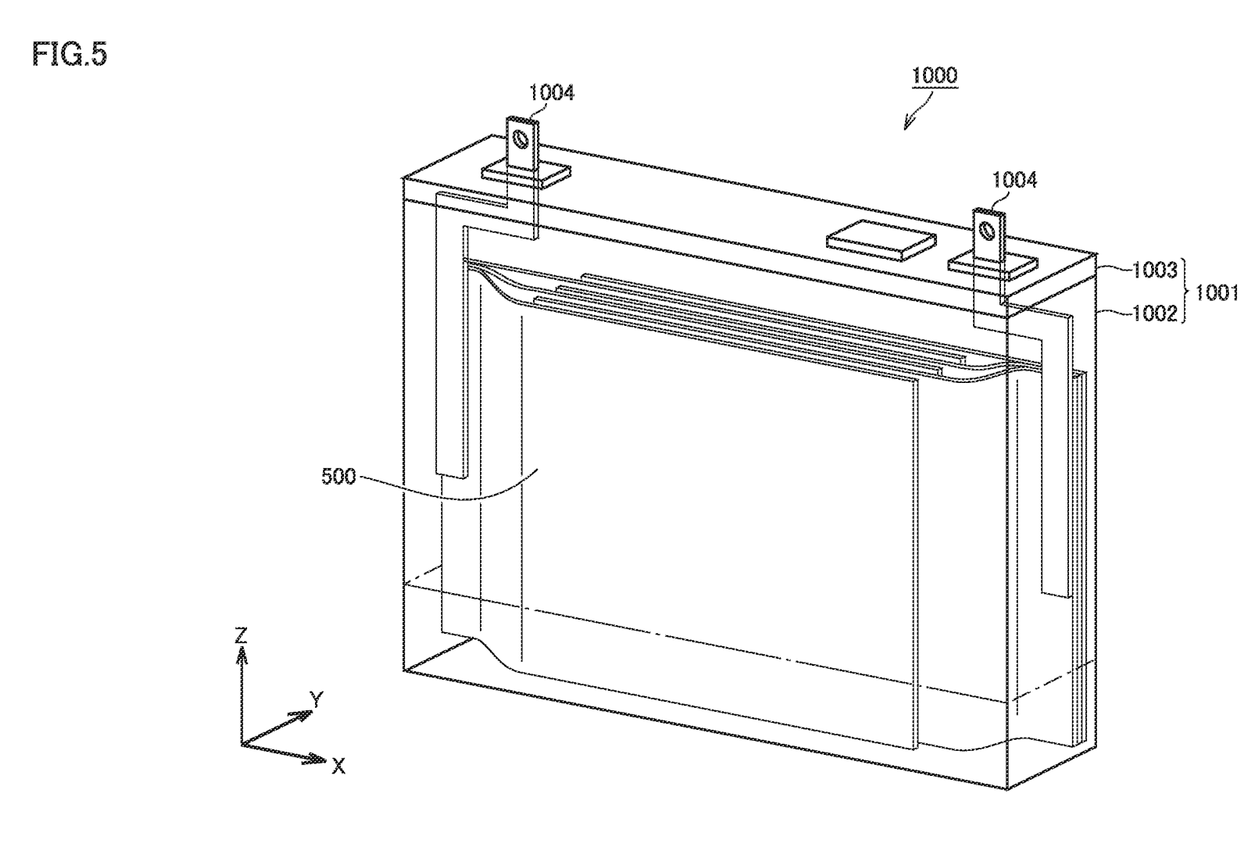
FIG. 5 is a schematic diagram showing one example of a construction of a lithium ion secondary battery in the present embodiment.

FIG. 5 is a schematic diagram showing one example of a construction of a lithium ion secondary battery in the present embodiment.

A battery 1000 is in a prismatic shape. The battery in the present embodiment, however, should not be limited to be in the prismatic shape. The battery in the present embodiment may be in a cylindrical shape.

Battery 1000 includes a case 1001. Case 1001 is hermetically sealed. Case 1001 can be made, for example, of a metal. Case 1001 can be made, for example, of an aluminum (Al) alloy. So long as the case can hermetically be sealed, the case may be, for example, a pouch made of an aluminum laminated film. The battery of the present embodiment may be a laminate-type battery.

Case 1001 includes a container 1002 and a lid 1003. Lid 1003 is joined to container 1002, for example, with laser welding. An external terminal 1004 is provided in lid 1003. Lid 1003 may be provided with a liquid introduction port, a gas exhaust valve, and a current interrupt device (CID).

Case 1001 accommodates an electrode group 500 and an electrolyte solution. Electrode group 500 is electrically connected to external terminal 1004. A chain dotted line in FIG. 5 shows a liquid level of the electrolyte solution. The electrolyte solution is also present in electrode group 500.

Figure 6:
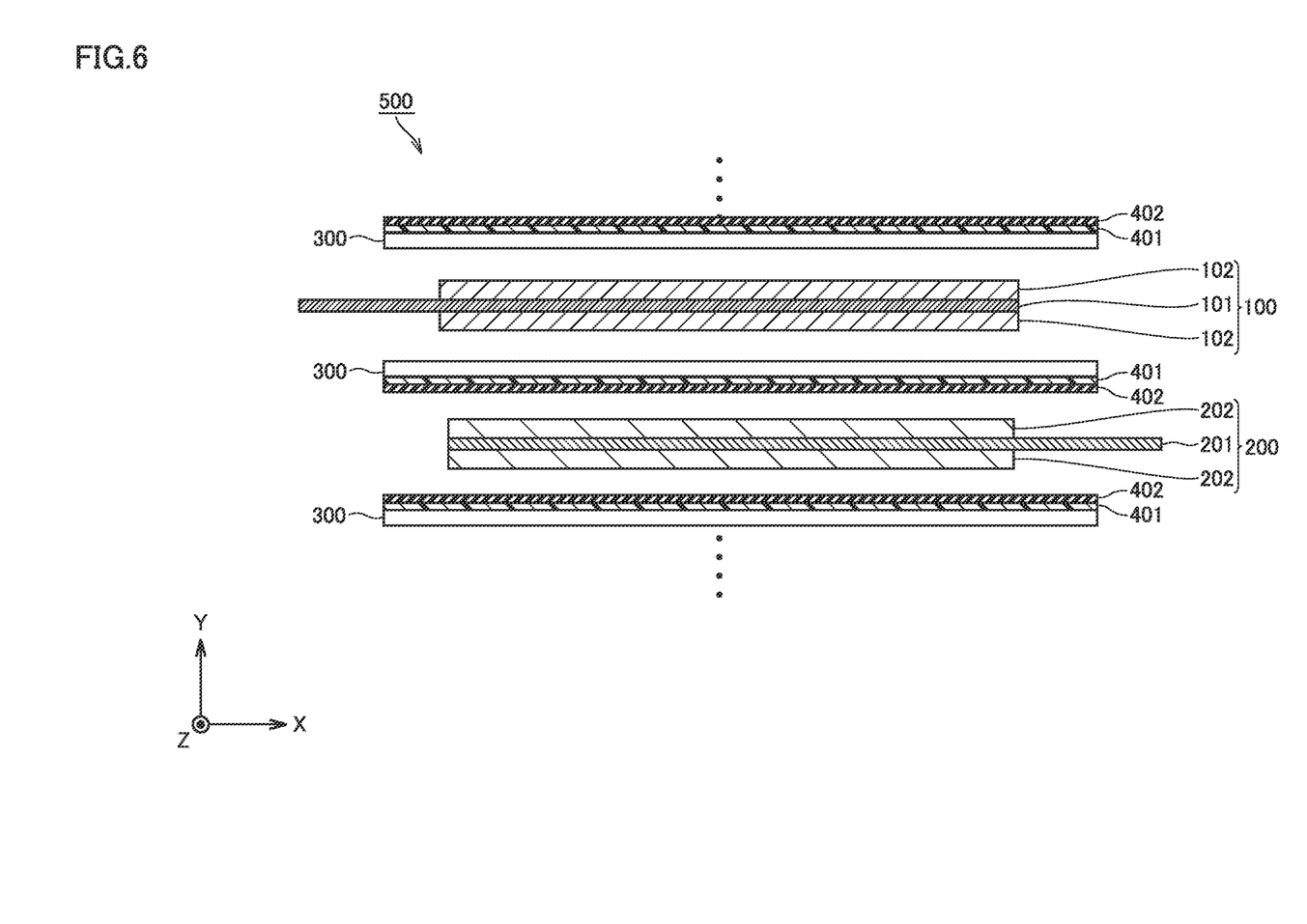
FIG. 6 is a conceptual cross-sectional view showing one example of a construction of an electrode group in the present embodiment.

FIG. 6 is a conceptual cross-sectional view showing one example of a construction of the electrode group in the present embodiment.

Electrode group 500 includes positive electrode 100, separator 300, first intermediate layer 401, second intermediate layer 402, and negative electrode 200. Battery 1000 includes at least positive electrode 100, separator 300, first intermediate layer 401, second intermediate layer 402, and negative electrode 200.

Separator 300 is arranged between positive electrode 100 and negative electrode 200. First intermediate layer 401 is arranged between separator 300 and negative electrode 200. Second intermediate layer 402 is arranged between first intermediate layer 401 and negative electrode 200.

Electrode group 500 is of a stack type. Electrode group 500 is formed by repeatedly stacking separator 300, positive electrode 100, separator 300, first intermediate layer 401, second intermediate layer 402, negative electrode 200, second intermediate layer 402, and first intermediate layer 401 in this order.

Naturally, the electrode group in the present embodiment should not be limited to the stack type. So long as the electrode group includes a positive electrode, a separator, a first intermediate layer, a second intermediate layer, and a negative electrode, the electrode group may be a wound type.

<<First Intermediate Layer>>

First intermediate layer 401 is a porous layer. First intermediate layer 401 includes a plurality of open pores. First intermediate layer 401 is arranged between separator 300 and negative electrode 200. First intermediate layer 401 may be formed, for example, on a surface of separator 300. First intermediate layer 401 may be formed, for example, on a surface of second intermediate layer 402. First intermediate layer 401 may have a thickness, for example, from 1 to 10 µm.

A "thickness" of each feature herein can be measured, for example, with a micrometer. A thickness of each feature may be measured in a cross-sectional electron micrograph (SEM). A thickness can be measured at least three times. An arithmetic mean resulting from at least three times of measurement can be adopted as a measurement result.

First intermediate layer 401 has a first weight per unit area. The first weight per unit area may be, for example, from 0.35 to 0.7 mg/cm$^2$. First intermediate layer 401 contains at least the MOF. First intermediate layer 401 may contain, for example, 90 to 99 mass % of MOF and 1 to 10 mass % of binder.

(MOF)

The MOF can be particulate. The MOF may have an average particle size, for example, from 0.1 to 10 µm. The MOF may have an average particle size, for example, from 0.1 to 1 µm. The "average particle size" herein can be measured with a laser diffraction/scattering method. The average particle size refers to a particle size at which a cumulative volume of particles from a finer side attains to 50% of the total volume of particles in a volume-based particle size distribution. Such a particle size is also referred to as "d50." An average particle size can be measured at least three times. An arithmetic mean resulting from at least three times of measurement can be adopted as a measurement result.

Figure 7:
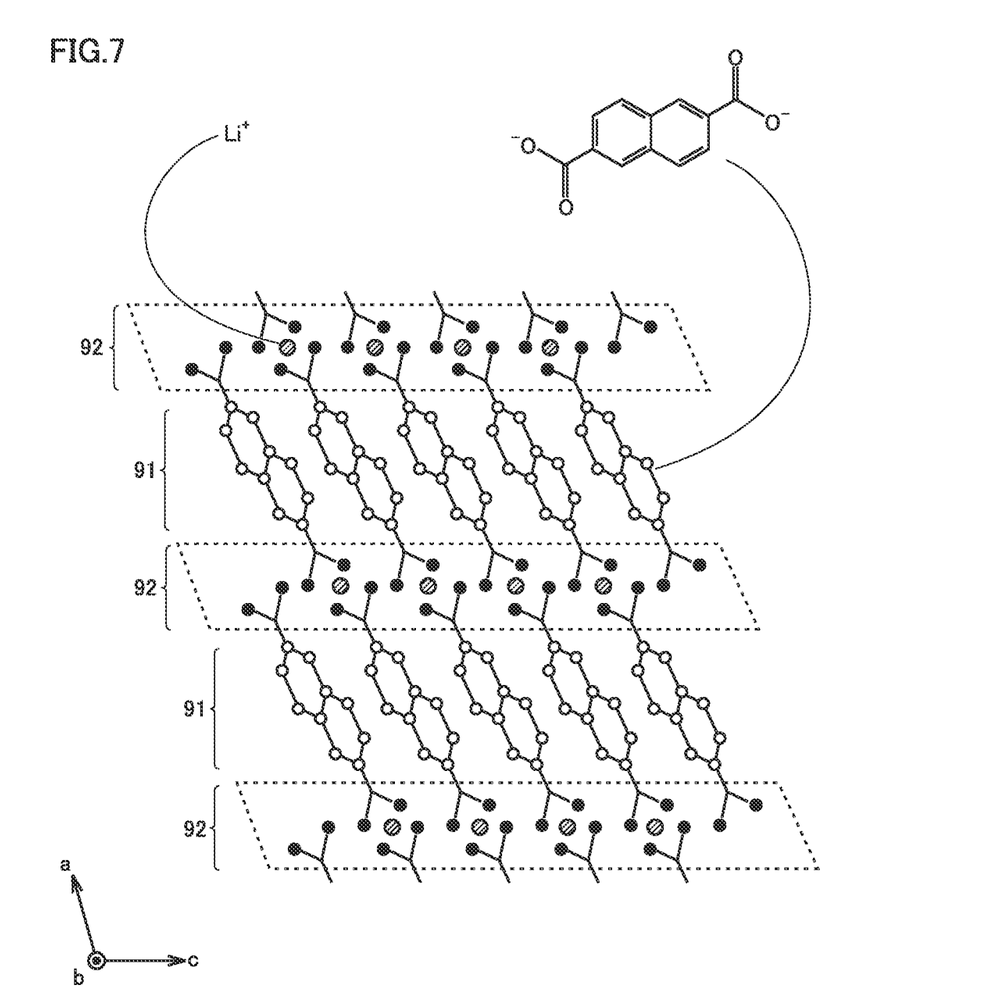
FIG. 7 is a conceptual diagram showing one example of an MOF in the present embodiment.

FIG. 7 is a conceptual diagram showing one example of the MOF in the present embodiment.

The MOF in the present embodiment has specific crystal structure. The crystal structure of the MOF can be specified, for example, with XRD. In the present embodiment, the crystal structure of the MOF may belong, for example, to a space group $P2_1/c$.

The MOF is formed by alternately stacking a first layer 91 and a second layer 92. First layer 91 is an organic layer so to speak. First layer 91 is formed by stacking an aromatic compound in a direction (a direction of a c axis in FIG. 7) intersecting with a direction of stack (a direction of an a axis in FIG. 7) of first layer 91 and second layer 92. It is considered that π-π stacking interaction is applied between the aromatic compounds in first layer 91. The aromatic compound contains two carboxylate anions (COO$^-$). The two carboxylate anions satisfy para-positional relation.

"Para-positional relation" herein represents a combination of most distant substitution positions among combinations of two substitution positions in a structural formula (a two-dimensionally expressed chemical formula) of an aromatic compound. For example, for a benzene ring, a combination of a first position and a fourth position corresponds to para-positional relation. For example, for a naphthalene ring, a combination of a second position and a sixth position corresponds to para-positional relation.

Second layer 92 is a metal layer so to speak. Second layer 92 is formed of Li ions (Li$^+$) coordinated to a carboxylate anion in first layer 91. Second layer 92 is considered to be formed, for example, of a unit composed of LiO$_4$. The MOF is considered to have an Li-ion absorption site in second layer 92. It is considered that Li ions are absorbed into second layer 92 by coordination of Li ions further to oxygen atoms (O) contained in a carboxylate anion.

First intermediate layer 401 is electrically independent of negative electrode 200. First intermediate layer 401 can have a potential independent of negative electrode 200. Therefore, in the present embodiment, as a result of a oxidation-reduction reaction between the MOF and Li dendrite 20 (Li metal) in first intermediate layer 401, Li dendrite 20 can be absorbed into the MOF and Li ions can be released from the MOF.

The oxidation-reduction reaction between the MOF and Li dendrite 20 is expressed, for example, with formulae (III) and (IV) below.

$$2Li \longrightarrow 2Li^+ + 2e^- \quad (III)$$

(IV)

The oxidation-reduction reaction in the formula (IV) can proceed, for example, at a potential around 0.8 V (vs. Li/Li$^+$). "V (vs. Li/Li$^+$)" represents a potential when a standard electrode potential of Li is defined as the reference. It is considered that, as a result of reaction from the left side to the right side in the formulae (III) and (IV), Li dendrite 20 is converted to Li ions and the Li ions are absorbed into the MOF. The Li ions absorbed into the MOF are released, for example, as a result of natural discharging during storage at a high temperature. Natural discharging is a reaction from the right side to the left side in the formula (IV).

The MOF in the present embodiment may undergo the oxidation-reduction reaction with the Li metal, for example, at a potential from 0.5 to 1.0 V (vs. Li/Li$^+$). When a potential at which the MOF undergoes the oxidation-reduction reaction with the Li metal is excessively high, natural discharging may be less likely to occur. When natural discharging is less likely to occur, efficiency in conversion of Li dendrite into Li ions may lower.

The aromatic compound may be aromatic hydrocarbon. The aromatic compound may be a complex aromatic compound. In the aromatic compound, some or all of hydrogen atoms (H) bonded to an aromatic ring may be substituted. A substituent for an aromatic ring may be, for example, a halogen atom, a hydroxy group, an alkyl group, an aryl group, an alkoxy group, a sulfonyl group, an amino group, or a cyano group. The aromatic compound of which first layer 91 is composed may be, for example, an aromatic compound expressed in the formula (I). The aromatic compound may be, for example, an aromatic compound expressed in any of formulae (V) to (VII).

(V)

(VI)

(VII)

(Binder)

First intermediate layer 401 may contain a binder. The binder binds components in a layer. The binder in first intermediate layer 401 may have an affinity for an organic solvent. The binder may be, for example, polyvinylidene difluoride (PVdF), a vinylidene difluoride-hexafluoropropylene copolymer [poly(VDF-co-HFP)], polyimide (PI), or polyamide-imide (PAI). One type of binder may be used alone. Two or more types of binders may be used as being combined. First intermediate layer 401 may contain at least one selected from the group consisting of PVdF, poly(VDF-co-HFP), PI, and PAI.

<<Second Intermediate Layer>>

Second intermediate layer 402 is a porous layer. Second intermediate layer 402 includes a plurality of open pores. Second intermediate layer 402 is arranged between first intermediate layer 401 and negative electrode 200. Second intermediate layer 402 may be formed, for example, on a surface of first intermediate layer 401. Second intermediate layer 402 may be formed, for example, on a surface of negative electrode 200. Second intermediate layer 402 may have a thickness, for example, from 1 to 10 μm.

Second intermediate layer 402 has a second weight per unit area. The second weight per unit area may be, for example, from 0.35 to 0.7 mg/cm$^2$. The second weight per unit area may be smaller than the first weight per unit area (the weight per unit area of first intermediate layer 401). Thus, reduction in amount of remaining Li dendrite 20 is expected.

Second intermediate layer 402 is electrically insulating. Second intermediate layer 402 electrically isolates first intermediate layer 401 from negative electrode 200. Second intermediate layer 402 is composed of an electrically insulating material. Second intermediate layer 402 may contain, for example, an inorganic filler and a binder. Second intermediate layer 402 may contain, for example, 90 to 99 mass % of inorganic filler and 1 to 10 mass % of binder. Second intermediate layer 402 may contain at least an inorganic filler.

(Inorganic Filler)

The inorganic filler is a particulate inorganic compound. The inorganic filler can be electrically insulating. The inorganic filler may be composed, for example, of a metal oxide. The inorganic filler may be, for example, alumina (Al$_2$O$_3$), boehmite (AlOOH), titania (TiO$_2$), zirconia (ZrO$_2$), or magnesia (MgO). One type of inorganic filler may be used alone.

Two or more types of inorganic fillers may be used as being combined. Second intermediate layer 402 may contain at least one selected from the group consisting of $Al_2O_3$, AlOOH, $TiO_2$, $ZrO_2$, and MgO. The inorganic filler may have an average particle size, for example, from 0.1 to 10 μm. The inorganic filler may have an average particle size, for example, from 0.1 to 1 μm.

(Binder)

Second intermediate layer 402 may contain a binder. The binder in second intermediate layer 402 may have an affinity for water. The binder may be, for example, polytetrafluoroethylene (PTFE), carboxymethyl cellulose (CMC), polyacrylic acid (PAA), an acrylic binder, or styrene-butadiene rubber (SBR). One type of binder may be used alone. Two or more types of binders may be used as being combined. Second intermediate layer 402 may contain at least one selected from the group consisting of PTFE, CMC, PAA, an acrylic binder, and SBR. The acrylic binder refers to a binder obtained by polymerizing at least one monomer selected from the group consisting of methacrylic acid ester, acrylic acid ester, and acrylonitrile. The acrylic binder may be a homopolymer of methacrylic acid ester, acrylic acid ester, or acrylonitrile. The acrylic binder may be a copolymer of at least one selected from the group consisting of methacrylic acid ester, acrylic acid ester, and acrylonitrile and another monomer (for example, a vinyl monomer).

<<Separator>>

Separator 300 is in a form of a porous sheet. Separator 300 may have a thickness, for example, from 5 to 50 μm. Separator 300 is arranged between positive electrode 100 and negative electrode 200. Separator 300 electrically isolates positive electrode 100 and negative electrode 200 from each other. Separator 300 can be composed of an electrically insulating material. Separator 300 can be composed, for example, of polyethylene (PE) or polypropylene (PP).

Separator 300 may have a single-layered structure. Separator 300 may be constructed only of a porous film (a PE layer) composed of PE. Separator 300 may have a multi-layered structure. Separator 300 may be formed, for example, by stacking a porous film (a PP layer) composed of PP, a porous film (a PE layer) composed of PE, and a porous film (a PP layer) composed of PP in this order.

<<Negative Electrode>>

Negative electrode 200 can be, for example, in a form of a sheet. Negative electrode 200 may include, for example, a negative electrode current collector 201 and a negative electrode composite material layer 202 (FIG. 6). Negative electrode current collector 201 may be, for example, a pure copper (Cu) foil or a Cu alloy foil. Negative electrode current collector 201 may have a thickness, for example, from 5 to 50 μm.

Negative electrode composite material layer 202 is formed on a surface of negative electrode current collector 201. Negative electrode composite material layer 202 may be formed on both of a front surface and a rear surface of negative electrode current collector 201. Negative electrode composite material layer 202 may contain, for example, 90 to 99.5 mass % of negative electrode active material and 0.5 to 10 mass % of binder.

The negative electrode active material can be particulate. The negative electrode active material may have an average particle size, for example, from 1 to 30 μm. The negative electrode active material should not particularly be limited. The negative electrode active material may be, for example, graphite, soft carbon, hard carbon, silicon, a silicon oxide, a silicon-based alloy, tin, a tin oxide, a tin-based alloy, or a lithium-containing titanium oxide. Graphite may be natural graphite or artificial graphite.

A shape of the particle of the negative electrode active material should not particularly be limited. For example, spheroidized natural graphite may be employed for the negative electrode active material. "Spheroidized natural graphite" refers to natural graphite (flake graphite) subjected to spheroidization. "Spheroidization" can be, for example, a treatment for shaping a particle to be closer to a spheroid through friction or pulverization in an air current.

The negative electrode active material may be a composite material of graphite and low-crystalline carbon. For example, a surface of spheroidized natural graphite may be coated with low-crystalline carbon. In the composite material, low-crystalline carbon may be contained, for example, at a ratio of 1 to 10 mass % to a total of spheroidized natural graphite and low-crystalline carbon. "Low-crystalline carbon" refers to a material including crystal structure (graphite structure) lower in crystallinity than natural graphite in which carbon hexagonal net planes are stacked.

One type of negative electrode active material may be used alone. Two or more types of negative electrode active materials may be used as being combined. The binder should not particularly be limited either. For example, CMC or SBR may be employed as the binder.

<<Positive Electrode>>

Positive electrode 100 can be, for example, in a form of a sheet. Positive electrode 100 may include, for example, a positive electrode current collector 101 and a positive electrode composite material layer 102. Positive electrode current collector 101 may be, for example, a pure Al foil or an Al alloy foil. Positive electrode current collector 101 may have a thickness, for example, from 5 to 50 μm.

Positive electrode composite material layer 102 is formed on a surface of positive electrode current collector 101. Positive electrode composite material layer 102 may be formed on both of a front surface and a rear surface of positive electrode current collector 101. Positive electrode composite material layer 102 may contain, for example, 80 to 98 mass % of positive electrode active material, 1 to 10 mass % of conductive material, and 1 to 10 mass % of binder.

The positive electrode active material can be particulate. The positive electrode active material may have an average particle size, for example, from 1 to 30 μm. The positive electrode active material should not particularly be limited. The positive electrode active material may be, for example, $LiCoO_2$, $LiNiO_2$, $LiMnO_2$, $LiMn_2O_4$, $LiNi_{1/3}Co_{1/3}Mn_{1/3}O_2$, $LiNi_{0.8}Co_{0.15}Al_{0.05}O_2$, or $LiFePO_4$. One type of positive electrode active material may be used alone. Two or more types of positive electrode active materials may be used as being combined.

The conductive material assists conduction of electrons in positive electrode composite material layer 102. The conductive material should not particularly be limited. The conductive material may be, for example, acetylene black (AB), Ketjenblack®, vapor-grown carbon fiber (VGCF), carbon nanotube (CNT), or graphite. One type of conductive material may be used alone. Two or more types of conductive materials may be used as being combined. The binder should not particularly be limited either. The binder may be, for example, PVdF.

<<<Electrolyte Solution>>

An electrolyte solution contains Li salt and a solvent. The electrolyte solution may contain, for example, 0.5 to 2 mol/l of Li salt. The Li salt functions as a supporting electrolyte.

The Li salt may be, for example, LiPF$_6$, LiBF$_4$, Li[N(FSO$_2$)$_2$], or Li[N(CF$_3$SO$_2$)$_2$]. One type of Li salt may be used alone. Two or more types of Li salt may be used as being combined.

The solvent is aprotic. The solvent may be, for example, a mixed solvent of cyclic carbonate and chain carbonate. A ratio of mixing may be set, for example, to "cyclic carbonate:chain carbonate=1:9 to 5:5 (at a volume ratio)."

Cyclic carbonate may be, for example, ethylene carbonate (EC), propylene carbonate (PC), butylene carbonate (BC), or fluoroethylene carbonate (FEC). One type of cyclic carbonate may be used alone. Two or more types of cyclic carbonate may be used as being combined.

Chain carbonate may be, for example, dimethyl carbonate (DMC), ethyl methyl carbonate (EMC), or diethyl carbonate (DEC). One type of chain carbonate may be used alone. Two or more types of chain carbonate may be used as being combined.

The solvent may include, for example, lactone, cyclic ether, chain ether, and carboxylate. Lactone may be, for example, γ-butyrolactone (GBL) or δ-valerolactone. Cyclic ether may be, for example, tetrahydrofuran (THF), 1,3-dioxolane, or 1,4-dioxane. Chain ether may be 1,2-dimethoxyethane (DME). Carboxylate may be, for example, methyl formate (MF), methyl acetate (MA), or methyl propionate (MP).

The electrolyte solution may further contain various functional additives in addition to the Li salt and the solvent. The electrolyte solution may contain, for example, 1 to 5 mass % of functional additive. Examples of the functional additive include a gas generating agent (what is called an overcharge additive) and a solid electrolyte interface (SEI) film forming agent. The gas generating agent may be, for example, cyclohexylbenzene (CHB) or biphenyl (BP). The SEI film forming agent may be, for example, vinylene carbonate (VC), vinyl ethylene carbonate (VEC), Li[B(C$_2$O$_4$)$_2$], LiPO$_2$F$_2$, propane sultone (PS), or ethylene sulfite (ES).

In the present embodiment, a gel electrolyte or a solid electrolyte may be used instead of the electrolyte solution (a liquid electrolyte). In the present embodiment, the gel electrolyte and the solid electrolyte may be used in addition to the electrolyte solution.

<Method of Manufacturing Lithium Ion Secondary Battery>

A method of manufacturing a lithium ion secondary battery in the present embodiment will be described below.

A manner of forming first intermediate layer 401 and second intermediate layer 402 in this order on a surface of separator 300 will be described herein by way of example. Battery 1000 in the present embodiment may be manufactured, for example, also by forming second intermediate layer 402 and first intermediate layer 401 in this order on a surface of negative electrode 200.

Figure 8:
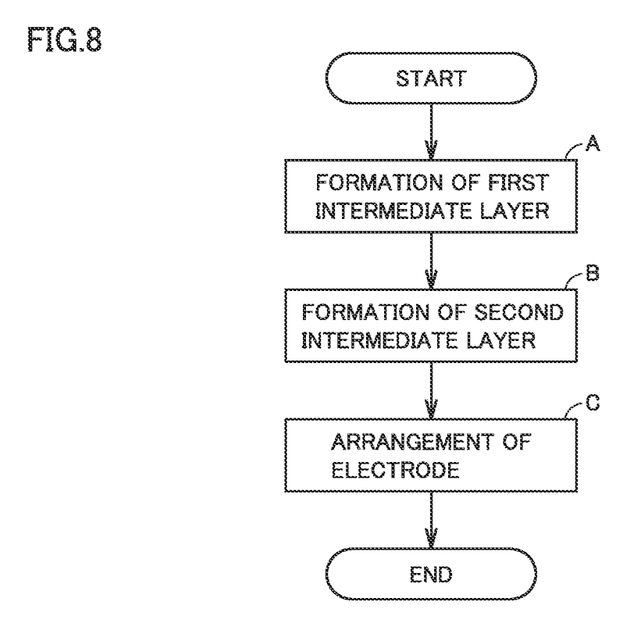
FIG. 8 is a flowchart showing overview of a method of manufacturing a lithium ion secondary battery in the present embodiment.

FIG. 8 is a flowchart showing overview of the method of manufacturing a lithium ion secondary battery in the present embodiment. The manufacturing method in the present embodiment includes at least "(A) formation of first intermediate layer," "(B) formation of second intermediate layer," and "(C) arrangement of electrode."

<<<(A) Formation of First Intermediate Layer>>

The manufacturing method in the present embodiment includes forming first intermediate layer 401 by applying a first paste to a surface of separator 300. The first paste contains at least a reaction product of aromatic dicarboxylic acid and lithium hydroxide and an organic solvent.

The reaction product of aromatic dicarboxylic acid and lithium hydroxide is prepared. The product is considered as the MOF described previously. The product can be prepared, for example, with a method below.

Aromatic dicarboxylic acid is prepared. In aromatic dicarboxylic acid, two carboxy groups satisfy para-positional relation. Aromatic dicarboxylic acid may be, for example, aromatic dicarboxylic acid expressed in the formula (II). Aromatic dicarboxylic acid may be, for example, aromatic dicarboxylic acid expressed with any of formulae (VIII) to (X).

(VIII)

(IX)

(X)

Lithium hydroxide may be, for example, a hydrate. For example, lithium hydroxide 1-hydrate is dissolved in pure water. An aqueous solution is thus prepared. Aromatic dicarboxylic acid is mixed in the aqueous solution. A ratio of mixing is set, for example, to "aromatic dicarboxylic acid:lithium hydroxide 1-hydrate=1:2 (at a molar ratio)." The aqueous solution is agitated around 100° C. under reflux. After agitation, water in the aqueous solution is removed by an evaporator. The MOF is thus obtained. An average particle size of the MOF may be adjusted through an operation such as pulverization and classification.

A first paste is prepared. In the present embodiment, an organic solvent is used for the first paste. The first paste is prepared to contain at least the MOF and an organic solvent. For example, the first paste can be prepared by mixing the MOF, a binder, and an organic solvent. When water is used for the first paste, the MOF may be unable to maintain crystal structure.

Details of the binder are as described previously. The organic solvent may be, for example, N-methyl-2-pyrrolidone (NMP), tetrahydrofuran (THF), dimethylformamide (DMF), methyl ethyl ketone (MEK), or dimethyl sulfoxide (DMSO). One type of organic solvent may be used alone. Two or more types of organic solvents may be used as being combined.

Separator 300 is prepared. Details of separator 300 are as described previously. The first paste is applied to a surface of separator 300 and dried. First intermediate layer 401 is thus formed. An application method can be a conventionally known application method (for example, a gravure application method). First intermediate layer 401 is formed to have a first weight per unit area.

<<(B) Formation of Second Intermediate Layer>>

The manufacturing method in the present embodiment includes forming second intermediate layer 402 by applying a second paste to a surface of first intermediate layer 401. The second paste contains at least an inorganic filler and water.

An inorganic filler is prepared. Details of the inorganic filler are as described previously. In the present embodiment, water is used for the second paste. The second paste is prepared to contain at least the inorganic filler and water. For example, the second paste can be prepared by mixing the inorganic filler, a binder, and water. Details of the binder are as described previously.

When an organic solvent is used for the second paste, first intermediate layer 401 and second intermediate layer 402 can be compatible with each other. When first intermediate layer 401 and second intermediate layer 402 are compatible with each other, first intermediate layer 401 and negative electrode 200 may be short-circuited to each other.

The second paste is applied to a surface of first intermediate layer 401 and dried. Second intermediate layer 402 is thus formed. An application method can be a conventionally known application method. Second intermediate layer 402 is formed to have a second weight per unit area. The second weight per unit area may be smaller than the first weight per unit area (the weight per unit area of first intermediate layer 401). Reduction in amount of remaining Li dendrite 20 is thus expected.

<<(C) Arrangement of Electrode>>

The manufacturing method in the present embodiment includes arranging positive electrode 100, separator 300, and negative electrode 200.

Positive electrode 100 and negative electrode 200 are prepared. Details of positive electrode 100 and negative electrode 200 are as described previously. A method of manufacturing positive electrode 100 and negative electrode 200 should not particularly be limited. Positive electrode 100 and negative electrode 200 can be prepared with a conventionally known method.

Separator 300 is arranged between positive electrode 100 and negative electrode 200. Negative electrode 200 is arranged to be opposed to second intermediate layer 402. Electrode group 500 is thus formed. In electrode group 500, first intermediate layer 401 is arranged between separator 300 and negative electrode 200. Second intermediate layer 402 is arranged between first intermediate layer 401 and negative electrode 200.

Case 1001 is prepared. Details of case 1001 are as described previously. Electrode group 500 and an electrolyte solution are accommodated in case 1001. Details of the electrolyte solution are as described previously. Case 1001 is hermetically sealed. Battery 1000 in the present embodiment can be manufactured as set forth above.

<Application of Lithium Ion Secondary Battery>

In battery 1000 in the present embodiment, even though Li dendrite is produced, it can be reduced. As a result of reduction in Li dendrite, decrease in amount of heat generation in heating of battery 1000 is expected. Therefore, battery 1000 in the present embodiment is considered as being suitable for applications where resistance to heating is required.

Applications in which resistance to heating is required include, for example, a power supply for driving for a hybrid vehicle (HV), a plug-in hybrid vehicle (PHV), an electric vehicle (EV), and the like. Applications of battery 1000 in the present embodiment should not be limited to car-mounted applications. Battery 1000 in the present embodiment can be applied to each and every application.

EXAMPLES

Examples of the present disclosure will be described below. The description below does not limit the scope of claims.

Example 1

<<(A) Formation of First Intermediate Layer>>

As aromatic dicarboxylic acid, 2,6-naphthalenedicarboxylate was prepared, which is expressed in the formula (II).

Lithium hydroxide 1-hydrate was dissolved in pure water. An aqueous solution was thus prepared. In the aqueous solution, 2,6-naphthalenedicarboxylate was mixed. A ratio of mixing was set to "2,6-naphthalenedicarboxylate:lithium hydroxide 1-hydrate=1:2 (at a molar ratio)." The aqueous solution was agitated for one hour at 100° C. under reflux. Water was removed by an evaporator. A reaction product of 2,6-naphthalenedicarboxylate and lithium hydroxide was thus obtained. The product was dried in vacuum at 110° C.

The obtained product is considered as the MOF. The MOF is considered to be formed by alternately stacking a first layer and a second layer. The first layer is considered to be formed by stacking an aromatic compound expressed in the formula (I). The second layer is considered to be formed by Li ions coordinated to a carboxylate anion in the first layer.

An average particle size of the MOF was adjusted through pulverization and classification. The pulverized and classified MOF had an average particle size of 0.5 μm.

Materials below were prepared.

MOF: prepared as above

Binder: PVdF

Separator: porous sheet (having a thickness of 20 μm and a three-layered structure of PP layer/PE layer/PP layer)

A first paste was prepared by mixing the MOF, the binder, and the solvent. The first paste was prepared to contain at least the MOF (the reaction product of 2,6-naphthalenedicarboxylate and lithium hydroxide) and the organic solvent. The ratio of mixing was set to "MOF:binder=95:5 (at a mass ratio)." The first paste was applied to a surface (one surface) of the separator and dried. The first intermediate layer was thus formed. The first intermediate layer had a first weight per unit area. The first weight per unit area was 0.35 mg/cm$^2$.

<<(B) Formation of Second Intermediate Layer>>

Materials below were prepared.

Inorganic filler: alumina ($Al_2O_3$ having an average particle size of 0.5 μm)

Binder: CMC and acrylic binder

Solvent: water

A second paste was prepared by mixing the inorganic filler, the binder, and water. The second paste was prepared to contain at least the inorganic filler and water. The ratio of mixing was set to "inorganic filler:binder=95:5." CMC and the acrylic binder were prepared in equal proportions. The second paste was applied to a surface of the first intermediate layer and dried to form the second intermediate layer. The second intermediate layer had a second weight per unit area. The second weight per unit area was 0.35 mg/cm$^2$.

<<(C) Arrangement of Electrode>>>
Materials below were prepared.
Positive electrode active material: $LiNi_{1/3}Co_{1/3}Mn_{1/3}O_2$
Conductive material: AB
Binder: PVdF
Solvent: NMP
Positive electrode current collector: Al foil A paste was prepared by mixing the positive electrode active material, the conductive material, the binder, and the solvent. A ratio of mixing was set to "positive electrode active material:conductive material:binder=90:8:2 (at a mass ratio)." The paste was applied to surfaces (both of a front surface and a rear surface) of the positive electrode current collector and dried. A positive electrode composite material layer was thus formed. The positive electrode composite material layer had a weight per unit area of 6 mg/cm² on one surface (12 mg/cm² on both surfaces). The positive electrode composite material layer was rolled. The positive electrode was prepared as set forth above.

Materials below were prepared.
Negative electrode active material: spheroidized natural graphite coated with low-crystalline carbon
Binder: CMC and SBR
Solvent: water
Negative electrode current collector: Cu foil A paste was prepared by mixing the negative electrode active material, the binder, and the solvent. A ratio of mixing was set to "negative electrode active material:binder=98:2 (at a mass ratio)." CMC and SBR were prepared in equal proportions. The paste was applied to surfaces (both of a front surface and a rear surface) of the negative electrode current collector and dried. A negative electrode composite material layer was thus formed. The negative electrode composite material layer had a weight per unit area of 3 mg/cm² on one surface (6 mg/cm² on both surfaces). The negative electrode composite material layer was rolled. The negative electrode was prepared as set forth above.

The positive electrode, the separator (having the first intermediate layer and the second intermediate layer formed), and the negative electrode were arranged. The separator was arranged between the positive electrode and the negative electrode. The negative electrode was arranged to be opposed to the second intermediate layer. The electrode group was thus formed.

A prescribed case and an electrolyte solution were prepared. The case accommodated the electrode group and the electrolyte solution. The electrolyte solution was composed as below.
Li salt: 1 mol/l of $LiPF_6$
Solvent: [EC:EMC:DMC=3:3:4 (at a volume ratio)]

The case was hermetically sealed. The electrode group was sufficiently impregnated with the electrolyte solution. A battery (lithium ion secondary battery) was manufactured as set forth above. The battery was designed to have a prescribed rated capacity within a range from 3.0 to 4.1 V. A state of charge (SOC) of the battery was adjusted to 100% in first charging. The battery was stored for twenty-four hours in an environment at 60° C. In the present experiment, a state after storage for twenty-four hours is defined as an initial state.

Examples 2 to 4

The battery was manufactured and set to the initial state as in Example 1 except for change in weight per unit area of the first intermediate layer and the second intermediate layer as shown in Table 1 below.

Comparative Example 1

The battery was manufactured and set to the initial state as in Example 1 except that the first intermediate layer was not formed as shown in Table 1 below.

Comparative Example 2

Lithium-containing titanium oxide ($Li_4Ti_5O_{12}$) having spinel type crystal structure was prepared. $Li_4Ti_5O_{12}$ had an average particle size of 0.5 μm.

The battery was manufactured and set to the initial state as in Example 1 except that the MOF was changed to $Al_2O_3$ in the first intermediate layer and $Al_2O_3$ was changed to $Li_4Ti_5O_{12}$ in the second intermediate layer as shown in Table 1 below.

Comparative Example 3

The battery was manufactured and set to the initial state as in Comparative Example 2 except for change in weight per unit area of the second intermediate layer as shown in Table 1 below.

Comparative Example 4

The battery was manufactured and set to the initial state as in Example 1 except that the MOF was changed to $Li_4Ti_5O_{12}$ in the first intermediate layer as shown in Table 1 below.

Comparative Example 5

The battery was manufactured and set to the initial state as in Comparative Example 4 except for change in weight per unit area of the first intermediate layer as shown in Table 1 below.

Comparative Example 6

The battery was manufactured and set to the initial state as in Example 1 except that the MOF was changed to $Al_2O_3$ in the first intermediate layer and $Al_2O_3$ was changed to the MOF in the second intermediate layer as shown in Table 1 below.

Comparative Example 7

The battery was manufactured and set to the initial state as in Comparative Example 6 except for change in weight per unit area of the second intermediate layer as shown in Table 1 below.

<Evaluation>

A cycle of a first treatment and a second treatment below of the battery was repeated three times in total.

<<First Treatment>>

In an environment at −10° C., a cycle below of charging, rest, discharging, and rest was repeated 500 times. A current rate at 40 C discharges the rated capacity in 1.5 minute.
Charging: current rate=40 C and time period=five seconds
Rest: ten minutes
Discharging: current rate=40 C and time period=five seconds
Rest: ten minutes <<Second Treatment>>

After the first treatment, the SOC of the battery was adjusted to 50%. In an environment at 55° C., the battery was stored for ten days.

<<Measurement of Amount of Heat Generation>>

The cycle of the first treatment and the second treatment was repeated three times in total and thereafter the battery was disassembled. The negative electrode and the separator were collected as an integrated component from the battery. The integrated component was cut into a prescribed size. A sample for measurement of an amount of heat generation was thus prepared.

A prescribed sample can was prepared. The sample for measurement of an amount of heat generation and an electrolyte solution were sealed in the sample can. The electrolyte solution was identical in composition to the electrolyte solution used for the battery (described previously). An amount of heat generation was measured with a Calvet calorimeter. A rate of temperature increase was set to 1° C./min. A value shown in a field of amount of heat generation in Table 1 below represents a relative value when an amount of heat generation in Comparative Example 1 is defined as 100. It is considered that Li dendrite is reduced as the amount of heat generation is smaller.

contains $Li_4Ti_5O_{12}$. $Li_4Ti_5O_{12}$ is considered to oxidize the Li metal at a potential around 1.6 V (vs. $Li/Li^+$) and absorb generated Li ions. Therefore, it is expected that Li dendrite is reduced by the second intermediate layer in Comparative Examples 2 and 3.

In Comparative Examples 2 and 3, however, reduction in amount of heat generation is not observed. Since $Li_4Ti_5O_{12}$ and the negative electrode are short-circuited to each other (that is, $Li_4Ti_5O_{12}$ is equal to the negative electrode in potential), it is considered that $Li_4Ti_5O_{12}$ is unable to oxidize Li dendrite independently of the negative electrode.

In Comparative Examples 4 and 5, the second intermediate layer ($Al_2O_3$) isolates the first intermediate layer ($Li_4Ti_5O_{12}$) from the negative electrode. In Comparative Examples 4 and 5, reduction in amount of heat generation is observed, however, an amount of reduction is small. It is considered that, with $Li_4Ti_5O_{12}$, natural discharging is less likely to occur. Therefore, it is considered that when an amount of absorption of Li ions into $Li_4Ti_5O_{12}$ exceeds a prescribed amount, an effect of reduction in Li dendrite is lost.

In Comparative Examples 6 and 7, the MOF is used. In Comparative Examples 6 and 7, reduction in amount of heat

TABLE 1

List of Examples and Comparative Examples

| | Second Intermediate Layer | | First Intermediate Layer | | Evaluation |
|---|---|---|---|---|---|
| | Filler | Weight per Unit Area (Second Weight per Unit Area) [mg/cm²] | Filler | Weight per Unit Area (First Weight per Unit Area) [mg/cm²] | Amount of Heat Generation [—] |
| Comparative Example 1 | $Al_2O_3$ | 0.7 | | | 100 |
| Comparative Example 2 | $Li_4Ti_5O_{12}$ | 0.35 | $Al_2O_3$ | 0.35 | 98 |
| Comparative Example 3 | $Li_4Ti_5O_{12}$ | 0.7 | $Al_2O_3$ | 0.35 | 99 |
| Comparative Example 4 | $Al_2O_3$ | 0.35 | $Li_4Ti_5O_{12}$ | 0.35 | 90 |
| Comparative Example 5 | $Al_2O_3$ | 0.35 | $Li_4Ti_5O_{12}$ | 0.7 | 85 |
| Comparative Example 6 | MOF | 0.35 | $Al_2O_3$ | 0.35 | 99 |
| Comparative Example 7 | MOF | 0.7 | $Al_2O_3$ | 0.35 | 98 |
| Example 1 | $Al_2O_3$ | 0.35 | MOF | 0.35 | 63 |
| Example 2 | $Al_2O_3$ | 0.35 | MOF | 0.7 | 45 |
| Example 3 | $Al_2O_3$ | 0.7 | MOF | 0.35 | 72 |
| Example 4 | $Al_2O_3$ | 0.7 | MOF | 0.7 | 55 |

<Result>

In the present experiment, the second intermediate layer is arranged between the negative electrode and the first intermediate layer. The first intermediate layer is arranged between the second intermediate layer and the separator. The second intermediate layer is in direct contact with the negative electrode. The first intermediate layer is spaced apart from the negative electrode by the second intermediate layer.

The negative electrode in the present experiment contains natural graphite as the negative electrode active material. The negative electrode in the present experiment is considered to absorb Li ions at a potential approximately from 0 to 0.2 V (vs. $Li/Li^+$).

In Comparative Examples 2 and 3, the second intermediate layer in direct contact with the negative electrode generation is not observed. It is considered that the MOF and the negative electrode are short-circuited to each other.

In Examples 1 to 4, reduction in amount of heat generation is clearly observed. It is considered that, since the MOF is isolated from the negative electrode, the MOF is able to oxidize Li dendrite independently of the negative electrode and absorb generated Li ions independently of the negative electrode. Furthermore, it is considered that the MOF releases Li ions owing to natural discharging during storage at a high temperature (during the second treatment described previously). It is thus considered that the MOF returns to a state that it is able to oxidize and absorb Li dendrite. It is considered that the MOF contributes to reduction in Li dendrite in a repetitive manner.

In Examples 1 to 4, when the second weight per unit area is smaller than the first weight per unit area, a tendency of large reduction in amount of heat generation is observed.

Though an embodiment of the present disclosure has been described, it should be understood that the embodiment disclosed herein is illustrative and non-restrictive in every respect. The technical scope defined by the terms of the claims is intended to include any modifications within the scope and meaning equivalent to the terms of the claims.

What is claimed is:

1. A method of manufacturing a lithium ion secondary battery, the method comprising:
    forming a first intermediate layer by applying a first paste to a surface of a separator;
    forming a second intermediate layer by applying a second paste to a surface of the first intermediate layer; and
    arranging a positive electrode, the separator, and a negative electrode,
    the separator being arranged between the positive electrode and the negative electrode,
    the negative electrode being arranged to be opposed to the second intermediate layer,
    the first paste containing at least a reaction product of aromatic dicarboxylic acid and lithium hydroxide and an organic solvent,
    the first paste not containing water, and
    the second paste containing at least an inorganic filler and water.

2. The method of manufacturing a lithium ion secondary battery according to claim 1, wherein
    the first intermediate layer is formed to have a first weight per unit area,
    the second intermediate layer is formed to have a second weight per unit area, and
    the second weight per unit area is smaller than the first weight per unit area.

3. The method of manufacturing a lithium ion secondary battery according to claim 1, wherein
    the aromatic dicarboxylic acid is expressed with a formula (II) below

* * * * *